United States Patent
Alizadeh et al.

(10) Patent No.: US 11,622,355 B2
(45) Date of Patent: Apr. 4, 2023

(54) WIRELESS FIDELITY UPLINK NON-ORTHOGONAL MULTIPLE ACCESS

(71) Applicant: Cisco Technology, Inc., San Jose, CA (US)

(72) Inventors: Ardalan Alizadeh, Milpitas, CA (US); Gautam D. Bhanage, Milpitas, CA (US); Khashayar Mirfakhraei, Los Altos, CA (US); Matthew A. Silverman, Shaker Heights, OH (US); Sivadeep R. Kalavakuru, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 17/301,176

(22) Filed: Mar. 29, 2021

(65) Prior Publication Data
US 2022/0312421 A1    Sep. 29, 2022

(51) Int. Cl.
*H04W 84/12* (2009.01)
*H04W 72/044* (2023.01)
*H04W 72/0453* (2023.01)

(52) U.S. Cl.
CPC ... *H04W 72/0473* (2013.01); *H04W 72/0453* (2013.01); *H04W 84/12* (2013.01)

(58) Field of Classification Search
CPC ......... H04W 72/0473; H04W 72/0453; H04W 84/12
USPC .................................................. 455/552, 69
See application file for complete search history.

(56) References Cited

U.S. PATENT DOCUMENTS

| | | | | |
|---|---|---|---|---|
| 8,626,228 B1 * | 1/2014 | Pulugurta | ............. | H04W 52/50 455/412.2 |
| 8,676,220 B2 * | 3/2014 | Kim | ................. | H04W 52/0206 370/332 |
| 8,862,049 B2 * | 10/2014 | Arcidiacono | .......... | H04H 40/90 342/361 |
| 8,909,945 B2 * | 12/2014 | Rudolf | .................. | H04W 52/46 713/300 |
| 8,934,362 B2 * | 1/2015 | Hsu | ....................... | H04W 52/34 370/254 |
| 8,983,519 B2 * | 3/2015 | Shibuya | .............. | H04W 52/265 455/522 |
| 9,451,554 B1 * | 9/2016 | Singh | ................... | H04B 17/354 |
| 9,872,258 B1 * | 1/2018 | Mansour | ............. | H04W 52/343 |

(Continued)

FOREIGN PATENT DOCUMENTS

EP       2814273 A1    12/2014
WO    WO-2017156211 A1 *  9/2017   .......... H04B 7/0452

(Continued)

OTHER PUBLICATIONS

Suh et al. "SOMA Updates," IEEE 802.11-19/0833r0, May 2019, 20 slides.

(Continued)

*Primary Examiner* — Hai V Nguyen
(74) *Attorney, Agent, or Firm* — Patterson + Sherdan, LLP

(57) ABSTRACT

A method includes instructing, by a WiFi access node, a first device to communicate using an uplink frequency band with a first uplink power. The method also includes instructing, by the WiFi access node, a second device to communicate (Continued)

using the uplink frequency band with a second uplink power different from the first uplink power.

18 Claims, 5 Drawing Sheets

(56) References Cited

U.S. PATENT DOCUMENTS

| | | | | |
|---|---|---|---|---|
| 10,051,649 | B2* | 8/2018 | Li | H04W 4/70 |
| 10,090,907 | B2* | 10/2018 | Xu | H01Q 1/243 |
| 10,187,180 | B2* | 1/2019 | Sorrentino | H04L 1/0026 |
| 10,425,973 | B2* | 9/2019 | Patel | H04W 52/16 |
| 10,511,414 | B2* | 12/2019 | Liu | H04L 5/0055 |
| 10,624,035 | B1* | 4/2020 | Pawar | H04W 52/146 |
| 10,659,116 | B1 | 5/2020 | Silverman et al. | |
| 10,659,967 | B2* | 5/2020 | Wei | H04W 16/14 |
| 10,749,551 | B1* | 8/2020 | Finkelstein | H04B 1/405 |
| 10,772,104 | B2* | 9/2020 | Won | H04L 25/067 |
| 10,805,139 | B2* | 10/2020 | Chen | H04L 27/2666 |
| 10,805,933 | B2* | 10/2020 | Stephens | H04W 72/08 |
| 10,880,864 | B2* | 12/2020 | Zhang | H04L 5/1453 |
| 10,880,895 | B2* | 12/2020 | Gordaychik | H04L 1/1896 |
| 10,924,214 | B2* | 2/2021 | Hamzeh | H04W 72/082 |
| 10,939,367 | B1* | 3/2021 | Koshy | H04W 48/16 |
| 11,083,032 | B2* | 8/2021 | Cui | H04W 76/16 |
| 11,153,907 | B2* | 10/2021 | Amin | H04W 72/1278 |
| 11,171,960 | B2* | 11/2021 | Levy | H04L 63/0227 |
| 11,172,451 | B1* | 11/2021 | Vivanco | H04W 52/346 |
| 11,178,615 | B2* | 11/2021 | Piipponen | H04W 52/367 |
| 11,290,247 | B2* | 3/2022 | Finkelstein | H04L 1/0003 |
| 11,296,911 | B2* | 4/2022 | Finkelstein | H04L 12/2801 |
| 11,317,336 | B2* | 4/2022 | Zhang | H04W 48/20 |
| 11,317,354 | B2* | 4/2022 | Yang | H04W 52/146 |
| 11,317,416 | B2* | 4/2022 | Gordaychik | H04W 74/0833 |
| 11,329,773 | B2* | 5/2022 | Lei | H04J 13/0003 |
| 2005/0020203 | A1* | 1/2005 | Losh | H04W 36/0085 455/431 |
| 2006/0141929 | A1* | 6/2006 | Lockie | H04W 16/26 455/11.1 |
| 2006/0223559 | A1* | 10/2006 | Chen | H04B 17/336 455/504 |
| 2010/0075689 | A1* | 3/2010 | Uemura | H04W 52/0206 455/63.1 |
| 2011/0213681 | A1* | 9/2011 | Shahid | H04W 4/20 370/259 |
| 2011/0319119 | A1* | 12/2011 | Ishii | H04W 52/367 455/522 |
| 2012/0149403 | A1* | 6/2012 | Su | H04W 52/0216 455/458 |
| 2012/0164948 | A1* | 6/2012 | Narasimha | H04L 1/188 455/63.1 |
| 2012/0176923 | A1* | 7/2012 | Hsu | H04W 52/243 370/252 |
| 2012/0282854 | A1* | 11/2012 | Arcidiacono | H04H 40/90 455/3.02 |
| 2013/0034124 | A1* | 2/2013 | Peyrotte | G01S 19/08 375/144 |
| 2013/0038424 | A1* | 2/2013 | Katar | H04W 48/18 340/5.8 |
| 2013/0064220 | A1* | 3/2013 | Yin | H04W 36/00835 370/331 |
| 2013/0107705 | A1* | 5/2013 | Dinan | H04W 72/0486 370/312 |
| 2013/0107827 | A1* | 5/2013 | Dinan | H04W 72/042 370/329 |
| 2013/0142113 | A1* | 6/2013 | Fong | H04L 1/0026 370/328 |
| 2013/0196670 | A1* | 8/2013 | Kim | H04W 36/00837 455/440 |
| 2013/0311669 | A1* | 11/2013 | Reimers | H04H 60/06 709/231 |
| 2013/0331045 | A1* | 12/2013 | Fron | H04B 1/0475 455/114.2 |
| 2014/0153390 | A1* | 6/2014 | Ishii | H04W 28/0815 370/230 |
| 2014/0269464 | A1* | 9/2014 | Park | H04W 52/0274 370/328 |
| 2014/0286178 | A1* | 9/2014 | Roy | H04W 52/18 370/252 |
| 2014/0313910 | A1* | 10/2014 | Appleton | H04L 1/20 370/252 |
| 2014/0328194 | A1* | 11/2014 | Sen | H04W 28/18 370/252 |
| 2015/0023287 | A1* | 1/2015 | Oga | H04W 36/0069 370/329 |
| 2015/0078186 | A1* | 3/2015 | Lagen Morancho | H04B 7/0426 370/252 |
| 2015/0085684 | A1* | 3/2015 | Sadek | H04W 72/1215 370/252 |
| 2015/0215947 | A1* | 7/2015 | Kaukovuori | H04W 72/0453 370/329 |
| 2015/0229458 | A1* | 8/2015 | Vedantham | H04B 3/544 375/238 |
| 2015/0282195 | A1* | 10/2015 | Farhadi | H04W 52/343 370/229 |
| 2015/0351054 | A1* | 12/2015 | Immonen | H04W 52/243 370/311 |
| 2016/0050634 | A1 | 2/2016 | Seok | |
| 2016/0135172 | A1* | 5/2016 | Sun | H04W 72/0413 370/329 |
| 2016/0261327 | A1 | 9/2016 | Merlin et al. | |
| 2016/0286603 | A1* | 9/2016 | Vajapeyam | H04W 72/0453 |
| 2016/0323915 | A1* | 11/2016 | Liu | H04W 74/0825 |
| 2016/0330676 | A1* | 11/2016 | Thangarasa | H04W 76/14 |
| 2017/0019863 | A1* | 1/2017 | Cariou | H04W 52/283 |
| 2017/0142766 | A1* | 5/2017 | Kim | H04W 48/20 |
| 2017/0188314 | A1* | 6/2017 | Mueck | H04W 24/02 |
| 2018/0013522 | A1* | 1/2018 | Liu | H04L 5/0055 |
| 2018/0027589 | A1* | 1/2018 | Yang | H04L 25/00 370/329 |
| 2018/0041885 | A1* | 2/2018 | Li | H04W 72/0446 |
| 2018/0084550 | A1* | 3/2018 | Chen | H04W 76/15 |
| 2018/0098223 | A1* | 4/2018 | Hugl | H04W 16/14 |
| 2018/0152257 | A1 | 5/2018 | Seo | |
| 2018/0184413 | A1* | 6/2018 | Rong | H04W 76/10 |
| 2018/0255519 | A1 | 9/2018 | Benjebbour et al. | |
| 2018/0310257 | A1* | 10/2018 | Papasakellariou | H04W 52/50 |
| 2019/0082395 | A1* | 3/2019 | Malladi | H04W 52/242 |
| 2019/0104480 | A1* | 4/2019 | Hasholzner | G06F 1/324 |
| 2019/0159136 | A1* | 5/2019 | MolavianJazi | H04L 5/001 |
| 2019/0165830 | A1* | 5/2019 | Bienas | H04B 1/7107 |
| 2019/0174432 | A1* | 6/2019 | Wang | H04W 52/365 |
| 2019/0245565 | A1* | 8/2019 | Luo | H04L 5/14 |
| 2019/0253976 | A1* | 8/2019 | Pelletier | H04W 52/146 |
| 2019/0261265 | A1* | 8/2019 | Wakabayashi | H04W 4/70 |
| 2019/0261315 | A1* | 8/2019 | Zhang | H04W 8/24 |
| 2019/0349799 | A1* | 11/2019 | Siomina | H04L 5/0094 |
| 2019/0349916 | A1* | 11/2019 | Fei | H04L 5/0051 |
| 2019/0349959 | A1* | 11/2019 | Nguyen | H04L 5/0091 |
| 2019/0363843 | A1* | 11/2019 | Gordaychik | H04W 52/58 |
| 2020/0022079 | A1* | 1/2020 | Piipponen | H04W 52/367 |
| 2020/0022145 | A1* | 1/2020 | Huang | H04W 72/042 |
| 2020/0037395 | A1* | 1/2020 | Ko | H04W 80/08 |
| 2020/0067661 | A1* | 2/2020 | Siomina | H04W 24/10 |
| 2020/0092056 | A1* | 3/2020 | Lei | H04L 5/0091 |
| 2020/0112806 | A1* | 4/2020 | Shiner | H04L 61/5069 |
| 2020/0144711 | A1* | 5/2020 | Lee | H01Q 21/28 |
| 2020/0154415 | A1* | 5/2020 | Oh | H04W 56/001 |
| 2020/0196313 | A1* | 6/2020 | Tao | H04W 72/048 |
| 2020/0245258 | A1* | 7/2020 | Wang | H04W 52/146 |
| 2020/0252193 | A1* | 8/2020 | Finkelstein | H04L 1/0009 |
| 2020/0252249 | A1* | 8/2020 | Finkelstein | H04L 25/14 |
| 2020/0274656 | A1* | 8/2020 | Gordaychik | H04L 5/0058 |
| 2020/0280872 | A1* | 9/2020 | Fiorani | H04W 28/18 |
| 2020/0329474 | A1* | 10/2020 | Shin | H04L 5/0044 |
| 2020/0358511 | A1* | 11/2020 | Hyung | H04L 5/0051 |
| 2021/0007095 | A1 | 1/2021 | Eldessoki et al. | |
| 2021/0044966 | A1* | 2/2021 | Warsaw | H04M 1/72412 |
| 2021/0058936 | A1* | 2/2021 | Gordaychik | H04W 72/0453 |
| 2021/0127414 | A1* | 4/2021 | Abdoli | H04W 72/1289 |

(56) References Cited

U.S. PATENT DOCUMENTS

| | | | |
|---|---|---|---|
| 2021/0144653 A1* | 5/2021 | Jang | H04W 52/365 |
| 2021/0144721 A1* | 5/2021 | Kurth | H04W 4/80 |
| 2021/0185485 A1* | 6/2021 | Deixler | H04W 84/18 |
| 2021/0204186 A1* | 7/2021 | Bodduru | H04W 72/0466 |
| 2021/0235311 A1* | 7/2021 | Soma | H04L 45/245 |
| 2021/0235460 A1* | 7/2021 | Bendigeri | H04W 48/16 |
| 2021/0243782 A1* | 8/2021 | Miao | H04L 1/1854 |
| 2021/0274381 A1* | 9/2021 | Teyeb | H04W 80/02 |
| 2021/0314649 A1* | 10/2021 | Veyseh | H04L 65/612 |
| 2021/0329571 A1* | 10/2021 | Yu | H04W 52/285 |
| 2021/0368323 A1* | 11/2021 | Johnson | H04W 48/16 |
| 2022/0006488 A1* | 1/2022 | Barois | H04B 3/38 |
| 2022/0022218 A1* | 1/2022 | Saha | H04W 72/0413 |
| 2022/0060999 A1* | 2/2022 | Oh | H04W 52/146 |
| 2022/0069846 A1* | 3/2022 | Loh | H04B 7/0413 |
| 2022/0069850 A1* | 3/2022 | Loh | H04B 1/0458 |
| 2022/0070742 A1* | 3/2022 | Zhao | H04W 48/16 |
| 2022/0094476 A1* | 3/2022 | Yang | H04L 5/0055 |
| 2022/0116103 A1* | 4/2022 | Cosic | H04B 7/15507 |
| 2022/0124480 A1* | 4/2022 | Huang | H04W 48/18 |
| 2022/0124598 A1* | 4/2022 | Bhowmik | H04B 17/24 |
| 2022/0141774 A1* | 5/2022 | Marupaduga | H04W 52/245 370/329 |
| 2022/0150004 A1* | 5/2022 | Deixler | H04W 72/0453 |
| 2022/0159671 A1* | 5/2022 | Kim | H04W 72/0453 |

FOREIGN PATENT DOCUMENTS

| | | | | |
|---|---|---|---|---|
| WO | WO-2019050980 A1 * | 3/2019 | | H04B 1/525 |
| WO | WO-2021066737 A1 * | 4/2021 | | H04N 21/437 |

OTHER PUBLICATIONS

Khorov et al. Experimental Study of NOMA/SOMA in Wi-Fi, IEEE 802.11-18/1957r3, Mar. 2019, 27 slides.

E. Khorov, A. Kureev and I. Levitsky, "NOMA Testbed on Wi-Fi," 2018 IEEE 29th Annual International Symposium on Personal, Indoor and Mobile Radio Communications (PIMRC), Bologna, Italy, 2018, pp. 1153-1154, doi: 10.1109/PIMRC.2018.8580931. [Abstract Only].

L. Dai, B. Wang, Z. Ding, Z. Wang, S. Chen and L. Hanzo, "A Survey of Non-Orthogonal Multiple Access for 5G," in IEEE Communications Surveys & Tutorials, vol. 20, No. 3, pp. 2294-2323, thirdquarter 2018, doi: 10.1109/COMST.2018.2835558. [Abstract Only].

PCT, Notification of Transmittal of The International Search Report and The Written Opinion of The International Searching Authority, or The Declaration for Application PCT/US2022/071288 dated Jul. 7, 2022.

* cited by examiner

WIRELESS FIDELITY UPLINK NON-ORTHOGONAL MULTIPLE ACCESS

TECHNICAL FIELD

Embodiments presented in this disclosure generally relate to wireless fidelity (WiFi) communication. More specifically, embodiments disclosed herein relate to using non-orthogonal multiple access (NOMA) during uplink over WiFi.

BACKGROUND

Devices may communicate with WiFi access nodes to gain access to a WiFi network. The WiFi access nodes may implement NOMA during downlink so that the WiFi access nodes can communicate messages to multiple devices over a shared frequency band at different downlink powers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes instructing, by a wireless fidelity access node, a first device to communicate using an uplink frequency band with a first uplink power. The method also includes instructing, by the wireless fidelity access node, a second device to communicate using the uplink frequency band with a second uplink power different from the first uplink power. Other embodiments include an apparatus for performing this method.

According to another embodiment, a method includes receiving, at a first device and from a wireless fidelity access node, an instruction to communicate with the wireless fidelity access node using an uplink frequency band with a first uplink power. A second device was instructed to communicate with the wireless fidelity access node using the uplink frequency band with a second uplink power. The method also includes communicating, by the first device, a message to the wireless fidelity access node using the uplink frequency band with the first uplink power.

EXAMPLE EMBODIMENTS

Devices may communicate with WiFi access nodes to gain access to a WiFi network. As technology has advanced, so have the number of devices that connect simultaneously to WiFi access nodes. For example, homes and businesses may include many connected user devices and many Internet of Things devices that all use communication resources of the WiFi access node. In high density environments or massive Internet of Things environments, the majority of network traffic is uplink traffic from the devices to the WiFi access nodes. Additionally, the transmit size per device is small. As the number of devices increases, a performance bottleneck may form in the uplink channels of the WiFi access nodes or the WiFi network.

This disclosure contemplates a WiFi communication scheme that implements NOMA during uplink. Generally, a WiFi access node may instruct one or more devices in the network to communicate messages to the WiFi access node over a shared frequency band but using different uplink powers. The WiFi access node may instruct these devices by broadcasting a common message to these devices or by communicating individual messages to the devices. In response, the devices communicate messages to the WiFi access node using the shared frequency band and different uplink powers. As a result of multiple devices sharing the uplink frequency band, the WiFi access node prevents a performance bottleneck from forming, in particular embodiments. Notably, even though simultaneous transmissions from the devices appear as a single transmission at the access node due to the transmissions being sent over a shared frequency band, the access node can nevertheless decode the apparent single transmission based on the uplink powers assigned to the devices to extract the individual transmissions made by the devices, which resolves interference caused by the transmissions being made over a shared frequency band.

Figure 1:
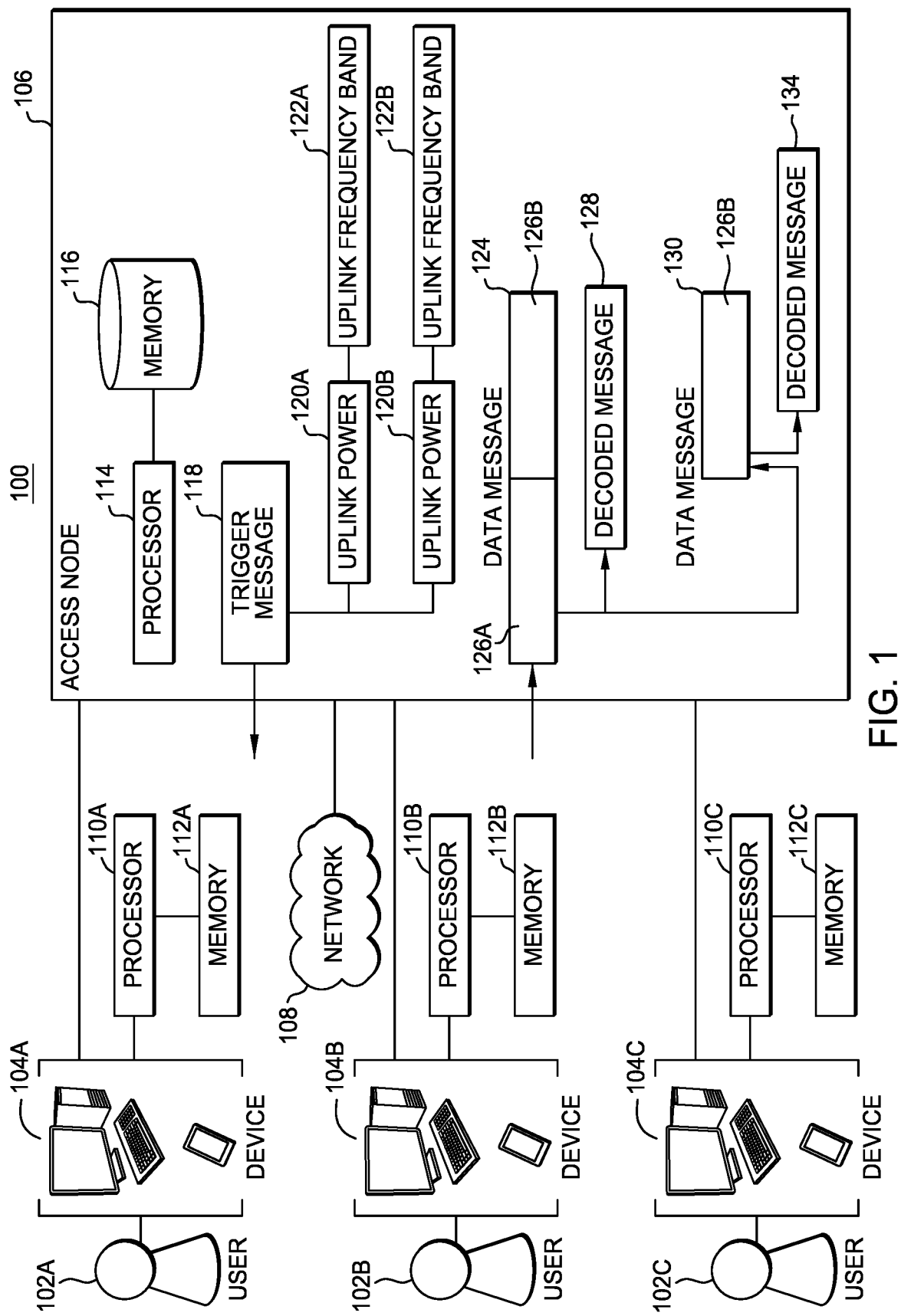
FIG. 1 illustrates an example system.

FIG. 1 illustrates an example system 100. As seen in FIG. 1, the system 100 includes one or more devices 104, an access node 106, and a network 108. Generally, the access node 106 is a WiFi access node that provides the devices 104 access to the network 108. The access node 106 implements NOMA during uplink so that the devices 104 can communicate messages to the access node 106 using a shared frequency band but different uplink powers. In this manner, the access node 106 removes certain performance bottlenecks during uplink, in particular embodiments.

One or more users 102 may use the one or more devices 104 to communicate with other components of the system 100. For example, each device 104 may communicate with the access node 106 using a WiFi protocol to access the network 108. As seen in FIG. 1, the system 100 includes a device 104A used by a user 102A, a device 104B used by a user 102B, and a device 104C used by a user 102C. Each device 104 includes a processor 110 and a memory 112, which are configured to perform any of the functions or actions of the device 104 described herein. The device 104A includes a processor 110A and a memory 112A. The device 104B includes a processor 110B and a memory 112B. The device 104C includes a processor 110C and a memory 112C.

A device 104 includes any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 includes a hardware processor, memory, or circuitry configured to perform any of the functions or actions of the device 104 described herein. For example, a software application designed using software code may be stored in the memory and executed by the processor to perform the functions of the device 104.

The processor 110 is any electronic circuitry, including, but not limited to microprocessors, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the device 104 by processing information (e.g., information received from the device 104, access node 106, and memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The access node 106 provides the devices 104 access to the network 108. The network 108 is any suitable network operable to facilitate communication between the components of the system 100. The network 108 may include any interconnecting system capable of transmitting audio, video, signals, data, messages, or any combination of the preceding. The network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The access node 106 implements NOMA during uplink so that the devices 104 may communicate with the access node 106 over a shared frequency band but using different uplink powers. In particular embodiments, the access node 106 reduces certain performance bottlenecks caused by a large number of devices 104 communicating messages to the access node 106 simultaneously by implementing NOMA during uplink. As seen in FIG. 1, the access node 106 includes a processor 114 and a memory 116, which are configured to perform any of the actions or functions of the access node 106 described herein.

The processor 114 is any electronic circuitry, including, but not limited to microprocessors, application specific integrated circuits (ASIC), application specific instruction set processor (ASIP), and/or state machines, that communicatively couples to memory 112 and controls the operation of the access node 106. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the access node 106 by processing information (e.g., information received from the devices 104, network 108, and memory 112). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 110. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 110 to perform one or more of the functions described herein.

The access node 106 implements NOMA by communicating one or more trigger messages 118 to the devices 104. The trigger message 118 includes information that the devices 104 use to configure their uplink powers and uplink frequency bands. The access node 106 may communicate any number of trigger messages 118 to configure the devices 104 in the system 100. For example, the access node 106 may broadcast one trigger message 118 that is received by several devices 104. The trigger message 118 includes information that is designated for each device 104. Each receiving device 104 analyzes a portion of the trigger message 118 designated for that device 104 to determine the uplink frequency band and uplink power that the device 104 should use to communicate messages to the access node 106. As another example, the access node 106 may generate and communicate a separate trigger message 118 for each device 104. Each separate trigger message 118 includes information that the receiving device 104 uses to set its uplink power and uplink frequency band. The access node 106 may communicate the separate trigger messages 118 by beamforming these trigger messages 118 to their respective devices 104. In this manner, the access node 106 improves the chances that the devices 104 receive trigger messages 118, in particular embodiments.

In some embodiments, the access node 106 communicates trigger messages 118 to the devices 104 based on the uplink frequency bands that the devices 104 will use. For example, the access node 106 may broadcast a trigger message 118 intended for the devices 104A and 104B. The trigger message 118 includes respective portions designated for the devices 104A and 104B. These respective portions instruct the devices 104A and 104B to communicate over a shared frequency band but to use different uplink powers. In response to this trigger message 118, the devices 104A and 104B communicate over the same uplink frequency band using different uplink powers. The access node 106 may then communicate a trigger message 118 to the device 104C. The access node 106 may communicate the trigger message 118 to the device 104C by broadcasting that trigger message 118 or by beamforming that trigger message 118 to the device 104C. That trigger message 118 instructs the device 104C to communicate over a second uplink frequency band that is different from the uplink frequency band used by the devices 104A and 104B. A trigger message 118 may also instruct the device 104C to use the same uplink power that is used by the device 104A or the device 104B. In this manner, the access node 106 communicates different trigger messages 118 to devices 104 that use different uplink frequency bands.

As discussed previously, the trigger message 118 includes respective portions that are designated for intended recipient devices 104. These portions indicate uplink powers and uplink frequency bands to be used by the intended recipient devices. Using the previous example, the trigger message 118 that the access node 106 broadcasts to the devices 104A and 104B may include uplink powers 120A and 120B and uplink frequency bands 122A and 122B. The uplink power 120A and the uplink frequency band 122A may be included in a first portion of the trigger message 118 designated for the device 104A. The uplink power 120B and the uplink frequency band 122B may be included in a second portion of the trigger message 118 designated for the device 104B. The uplink frequency band 122A is the same as the uplink frequency band 122B, indicating that the devices 104A and 104B are communicating over a shared frequency band. The uplink power 120A is different from the uplink power 120B to configure the devices 104A and 104B to communicate at different uplink powers over a shared frequency band. When the devices 104A and 104B receive the trigger message 118, the device 104A locates the first portion of the trigger message 118 and sets its uplink frequency band to the uplink frequency band 122A and its uplink power to the uplink power 120A. Likewise, the device 104B locates the second portion of the trigger message 118 and sets its uplink frequency band to the uplink frequency band 122B and its uplink power to the uplink power 120B. The devices 104A and 104B may then communicate data messages to the access node 106 using these settings.

The access node 106 receives a data message 124 that includes portions 126 communicated by devices 104 over a shared frequency band. The portions 126 may have been communicated by the devices 104 simultaneously, and these portions 126, when received by the access node 106, appear to the access node 106 as a singular transmission over the shared frequency band. Using the previous example, the data message 124 includes portions 126 communicated simultaneously by the devices 104A and 104B over a common frequency band. The data message 124 includes a portion 126A communicated by the device 104A and a portion 126B communicated by the device 104B. FIG. 1 illustrates the portions 126 being ordered sequentially in the message 124 merely for clarity. It is more likely the case that the portions 126 are interleaved or jumbled together to form the message 124.

The access node 106 decodes the portions 126 of the data message 124 separately based on the uplink powers used to communicate the portions 126. For example, the access node 106 may first decode the portions of the data message 124 that were transmitted using the uplink power 120A assigned to the device 104A to produce a decoded message 128. The decoded message 128 includes a message communicated by the device 104A using the uplink frequency band 122A and the uplink power 120A. The access node may analyze the decoded message 128 and respond to the device 104A accordingly.

After the access node 106 generates the decoded message 128, the access node 106 subtracts from the message 124 the portions 126 that were decoded to form a second data message 130. The second data message 130 includes portions 126 that remain undecoded. In the example of FIG. 1, the second data message 130 includes the portion 126B. The access node 106 then decodes the portions of the second data message 130 that were transmitted using the uplink power 126B to produce a decoded message 134. The decoded message 134 includes a message communicated by the device 104B using the uplink frequency band 122B and the uplink power 120B. The access node 106 may analyze the decoded message 134 and respond to the device 104B accordingly. This process may continue until all portions of the data message 124 have been decoded.

The access node 106 may apportion any number of uplink powers to be used by any number of devices 104 over a shared frequency band. The access node 106 receives a data message 124 that includes any number of portions 126 depending on the number of devices 104 communicating over a shared frequency band. The access node 106 decodes each of these portions 126 sequentially using the process described above. Each time the access node 106 decodes a portion, the access node 106 reconstructs the data message and then decodes a subsequent portion. In this manner, the access node 106 handles communications from multiple devices 104 communicating over a shared frequency band and different uplink powers. As a result of allowing the devices 104 to communicate over a shared frequency band, the access node 106 removes certain performance bottlenecks during uplink, in particular embodiments.

In some embodiments the access node 106 sets the uplink powers 120 for the devices 104 based on path losses or distances between the devices 104 and the access node 106. For example, a device 104 that is closest to the access node 106 may be given a lowest uplink power 120 and a device 104 that is furthest from the access node 106 may be assigned a highest uplink power 120. The access node 106, however, may assign the uplink powers 120 in any manner. For example, the access node 106 may assign a device 104 that is closest to the access node 106 the highest uplink power 120, and the access node 106 may assign a device 104 that is furthest from the access node 106 a lowest uplink power 120.

Although the example of FIG. 1 includes three devices 104A, 104B, and 104C, the system 100 may include any number of devices 104. The access node 106 may communicate a trigger message 118 to any number of devices 104, and the access node 106 may configure any number of devices 104 to communicate with the access node 106 over a shared frequency band but using different uplink powers.

Figure 2A:
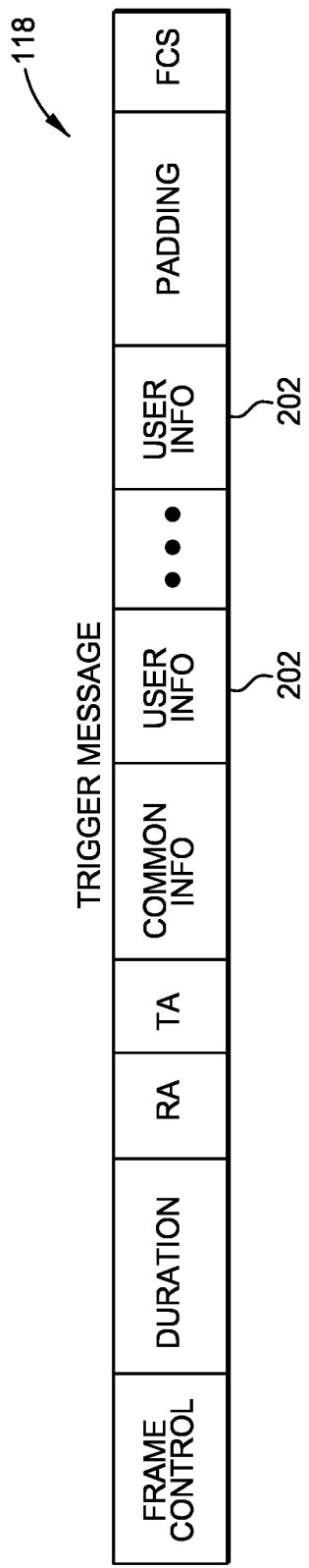
FIG. 2A illustrates an example trigger message in the system of FIG. 1.

FIG. 2A illustrates an example trigger message 118 (e.g., a frame) in the system 100. As seen in FIG. 2A the trigger message 118 includes several fields, such as a frame control field, a duration field, a recipient address (RA) field, a transmitter address (TA) field, a common info field, one or more user info fields 202, a padding field, and a frame check sequence field. The fields in the trigger message 118 may be used to direct the trigger message 118 to the intended devices 104. The devices 104 may use various fields of the trigger message 118 to configure their uplink frequency bands and uplink powers. Specifically, each user info field 202 in the trigger message 118 includes information designated for a particular receiving device 104. For example, a user info field 202 includes an uplink power 120 and an uplink frequency band 122 that a receiving device 104 uses to communicate messages to the access node 106. Each user info field 202 in the trigger message 118 may specify the same uplink frequency band 122 but a different uplink power 120. Each user info field 202 also includes an identifier for a particular device 104. When a device 104 receives the trigger message 118, the device 104 analyzes the various user info fields 202 in the trigger message 118 to locate the user info field 202 that includes an identifier for the device 104. When the device 104 locates the user info field 202 that includes the identifier for the device 104, the device 104 retrieves the uplink power 120 and the uplink frequency band 122 in that user info field 202. The device 104 then sets its uplink power and uplink frequency band accordingly. In this manner, the trigger message 118 is used by several devices 104 to configure their uplink frequency bands to a shared uplink frequency band and their uplink powers to different uplink powers, in particular embodiments.

Figure 2B:
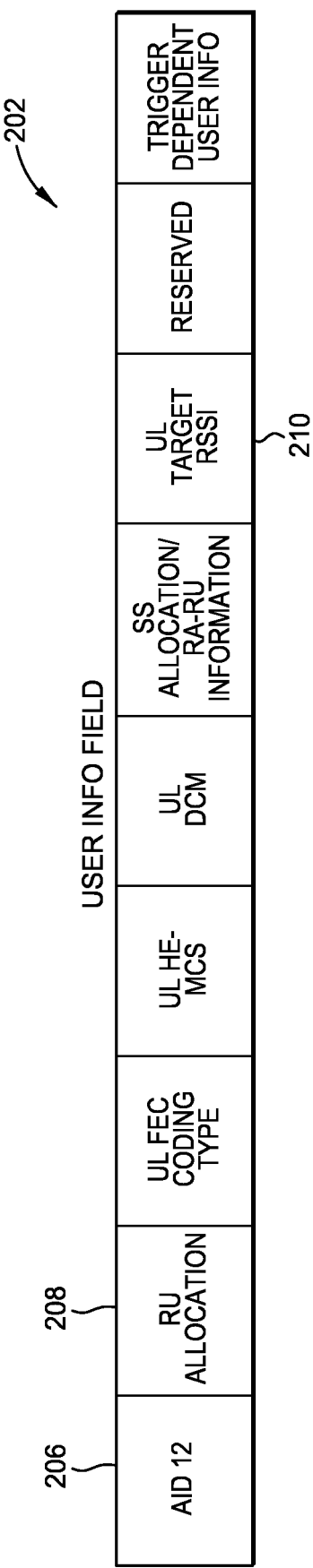
FIG. 2B illustrates an example user info field in the trigger message of FIG. 2A.

FIG. 2B illustrates an example user info field 202 in the trigger message 118 of FIG. 2A. As seen in FIG. 2B, the user info field 202 includes several fields, including an AID12 field 206, a resource unit (RU) allocation field 208, an upper layer forward error correction (UL-FEC) coding type field, a modulation coding scheme (UL HE-MCS) field, a dual carrier modulation (UL DCM) field, a spatial stream (SS) allocation/resource unit (RU) information field, an uplink target receives signal strength indicator (UL Target RSSI) field 210, a reserved field, and a trigger dependent user info field. The AID12 field 206 includes an identifier for an intended receiving device 104. When a device 104 receives the trigger message 118, the device 104 examines the AID12 fields 206 in the user info fields 202 of the trigger message 118 to locate the user info field 202 in the trigger message 118 that is designated for the device 104. When the device 104 locates an identifier for the device 104 in the AID12 field 206, the device 104 has located its user info field 202.

The RU allocation field 208 indicates an uplink frequency band 122 to be used by the device 104. The device 104 may set its uplink frequency band to an uplink frequency band 122 indicated by the RU allocation field 208. The UL Target RSSI field 210 indicates an uplink power 120 to be used by the device 104. The device 104 sets its uplink power according to the uplink power 120 indicated by the UL Target RSSI field 210. In this manner, the device 104 configures its uplink frequency band and uplink power using the information in its designated user info field 202 in the trigger message 118.

Figure 3:
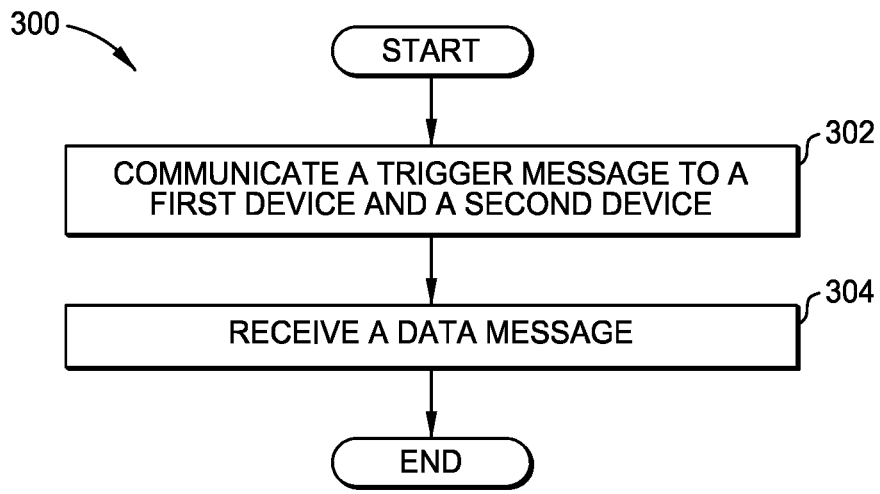
FIG. 3 is a flowchart of an example method in the system of FIG. 1.

FIG. 3 is a flowchart of an example method 300 in the system 100 of FIG. 1. The access node 106 performs the method 300. In particular embodiments, by performing the method 300, the access node 106 removes certain performance bottlenecks during uplink by allowing a larger number of devices to communicate simultaneously over a shared frequency band.

In block 302, the access node 106 communicates a trigger message 118 to a first device 104A and a second device 104B. The access node 106 may broadcast the trigger message 118 to the first and second devices 104A and 104B. The trigger message 118 includes fields that indicate an uplink power 120 and an uplink frequency band 122 to be used by the devices 104A and 104B. For example, the trigger message 118 may instruct the devices 104A and 104B to use a shared frequency band 122 but different uplink powers 120. The trigger message 118 includes a portion designated for the device 104A (e.g., a user info field 202 with an identifier that matches an identifier of the device 104A). That portion includes an uplink frequency band 122A and an uplink power 120A. The trigger message 118 also includes a portion designated for the device 104B (e.g., a user info field with an identifier that matches an identifier of the device 104B). That portion includes an uplink frequency band 122B and an uplink power of 120B. The uplink frequency bands 122A and 122B may be the same, and the uplink powers 120A and 120B may be different. In this manner, the access node 106 instructs the devices 104A and 104B to communicate over a shared frequency band but to use different uplink powers.

In block 304, the access node 106 receives a data message 124. The data message 124 includes portions 126 communicated by the devices 104A and 104B simultaneously using the shared frequency band but different uplink powers. Even though the portions 126 are communicated and received separately, the portions 126 appear as a single transmission (e.g., the data message 124) at the access node 106 because the portions 126 are communicated over a shared frequency band simultaneously. A first portion 126A of the data message 124 was communicated by the device 104A. A second portion 126B of the data message 124 was communicated by the device 104B. The access node 126 processes the data message 124 to extract the separate messages communicated by the devices 104A and 104B.

Figure 4:
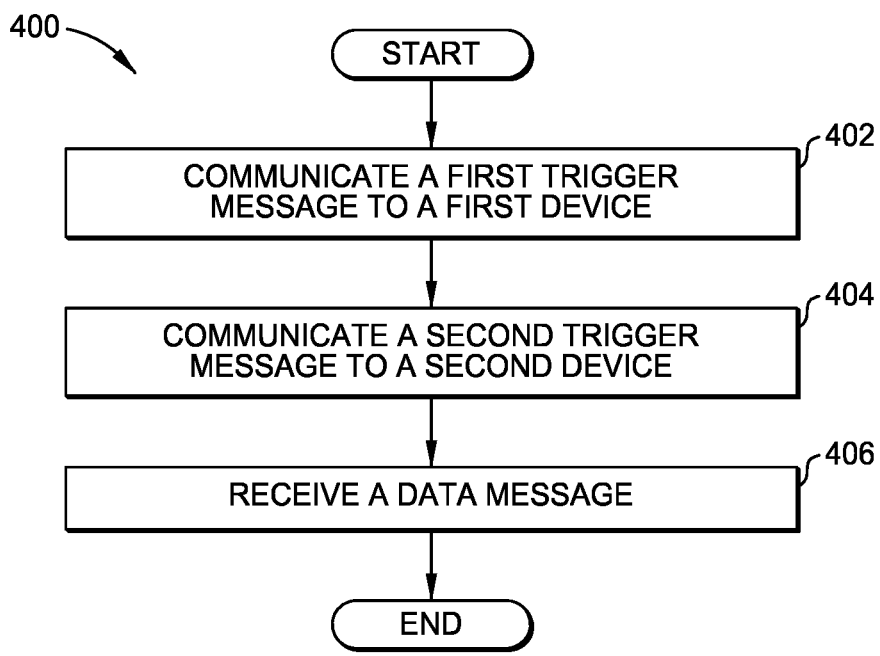
FIG. 4 is a flowchart of an example method in the system of FIG. 1.

FIG. 4 is a flowchart of an example method 400 in the system 100 of FIG. 1. The access node 106 performs the method 400. In particular embodiments, by performing the method 400, the access node 106 removes certain performance bottlenecks during uplink, which reduces congestion and slowdowns.

In block 402, the access node 106 communicates a first trigger message 118 to a first device 104A. The access node 106 may beamform the first trigger message 118 to the first device 104A. The first trigger message 118 includes an uplink power 120 and an uplink frequency band 122 to be used by the device 104A to communicate messages to the access node 106.

In block 404, the access node 106 communicates a second trigger message 118 to a second device 104B. The access node 106 may beamform the second trigger message 118 to the second device 104B. In some embodiments, the access node 106 communicates the second trigger message 118 to the second device 104B in parallel with the first trigger message 118 to the first device 104A. The second trigger message 118 may include an uplink power 120 and an uplink frequency band 122 to be used by the second device 104B to communicate messages to the access node 106. The second device 104B sets its uplink frequency band and uplink power according to the uplink frequency band 122 and the uplink power 120 in the second trigger message 118.

The uplink frequency bands 122 in the first trigger message 118 and the second trigger message 118 may be the same, but the uplink power 120 in the first trigger message 118 and the uplink power 120 in the second trigger message 118 may be different. As a result, the devices 104A and 104B are set to communicate over a shared frequency band using different uplink powers.

In block 406, the access node 106 receives a data message 124. The data message 124 includes portions 126 communicated simultaneously by the devices 104A and 104B. For example, the data message 124 includes a first portion 126A communicated by the device 104A using the shared frequency band and the uplink power specified by the first trigger message 118. The data message 124 includes a second portion 126B communicated by the device 104B using the shared frequency band and the uplink power specified by the second trigger message 118. Even though the portions 126A and 126B are communicated by separate devices 104, the portions 126A and 126B appear as one transmission of the data message 124 at the access node 106, because the portions 126A and 126B are transmitted simultaneously over a shared frequency band. The access node 106 may process the data message 124 to extract the separate messages communicated by the devices 104A and 104B.

Figure 5:
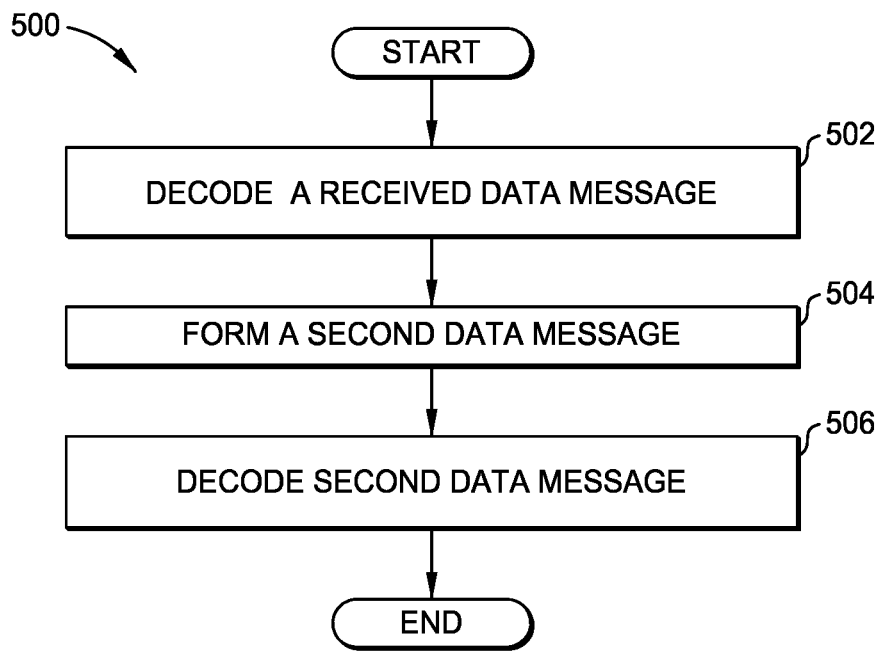
FIG. 5 is a flowchart of an example method in the system of FIG. 1.

FIG. 5 is a flowchart of an example method 500 in the system 100 of FIG. 1. The access node 106 performs the method 500. In particular embodiments, by performing the method 500, the access node 106 decodes messages communicated by devices 104 using a shared frequency band but different uplink powers.

The access node 106 decodes a received data message 124 in block 502. The access node 106 produces a decoded message 128 by decoding the portions of the data message 124 that were transmitted using an uplink power assigned to a first device 104A. The decoded message 128 thus includes the data communicated by the first device 104A.

In block 504, the access node 106 forms a second data message 130 by subtracting the portions of the data message 124 that were decoded in block 502. In block 506, the access node 106 decodes portions of the second data message 130 that were transmitted using an uplink power assigned to a second device 104B to produce a decoded message 134. The decoded message 134 may be a message communicated by the device 104B using the shared frequency band and a different uplink power than the device 104A used. That is, the decoded message 134 includes only the data transmitted by the device 104B, and not any data transmitted by the device 104A. In this manner, the access node 106 decodes messages communicated by the devices 104A and 104B using a shared frequency band and different uplink powers.

Figure 6:
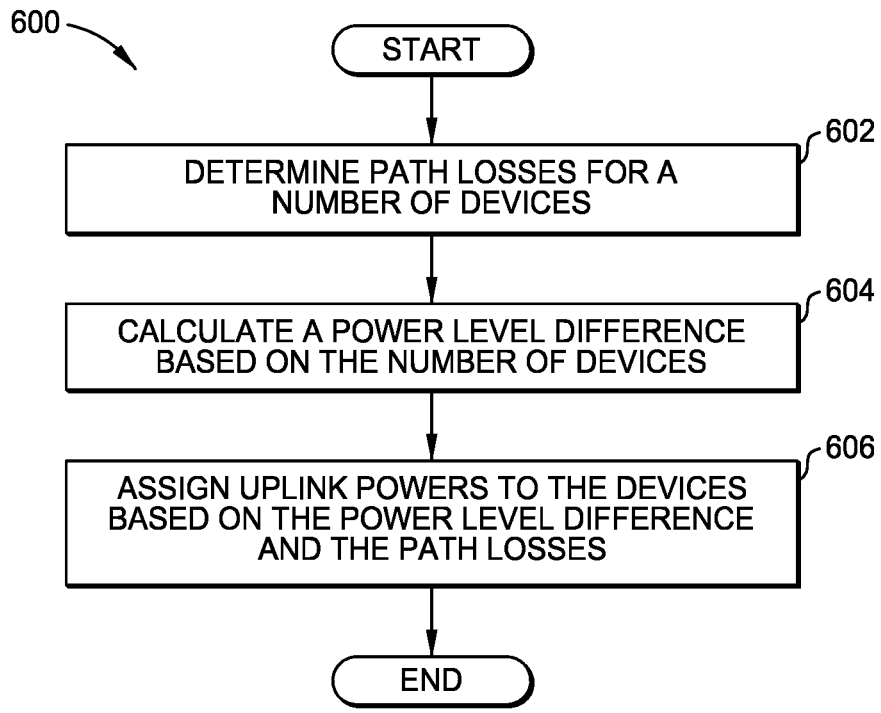
FIG. 6 is a flowchart of an example method in the system of FIG. 1.

FIG. 6 is a flowchart of an example method 600 in the system 100 of FIG. 1. The access node 106 performs the method 600. In particular embodiments, by performing the method 600, the access node 106 determines the uplink powers to be used by different devices 104 over a shared frequency band.

In block 602, the access node 106 determines path losses for a number of devices 104. For example, the access node 106 determines a path loss for each device 104 connected to the access node 106. The path loss represents an amount of energy that a radio wave communicated by a device 104 loses as the radio wave travels from the device 104 to the access node 106. The path loss may depend upon a distance between the device 104 and the access node 106. The greater the distance between the device 104 and the access node 106, the greater the path loss between the device 104 and the access node 106. In one embodiment, the access node 106 orders the devices 104 based on their path losses.

In block 604, the access node 106 calculates a power level difference based on the number of devices 104 connected to the access node 106. The power level difference represents a difference between the power levels assigned to successive devices 104. Stated differently, the power level difference represents an interval between powers assigned to the devices 104. The access node 106 may determine the power level difference based on a desired signal-to-quantization noise ratio for the devices 104. For example, the access node 106 may subtract the minimum signal-to-quantization noise ratio from a maximum scale and then divide this difference by the number of devices 104 minus one to determine the power level difference.

In block 606, the access node 106 assigns uplink powers 120 to the devices 104 based on the power level difference and the path losses. For example, the access node 106 may assign a device 104 with the highest path loss to the minimum signal-to-quantization noise ratio. The access node 106 may then add the power level difference to the power assigned to the first device 104 to determine a power for a second device 104. This process may continue until each device 104 has been assigned a desired power. The access node 106 may then calculate a signal-to-interference plus noise for each device 104 and select a constellation size (MCS) based on the signal-to-interference plus noise from a lookup table. The access node 106 may then set the Uplink Target RSSI fields 210 of one or more trigger messages 118 for the devices 104 and send the trigger message(s) 118.

Figure 7:
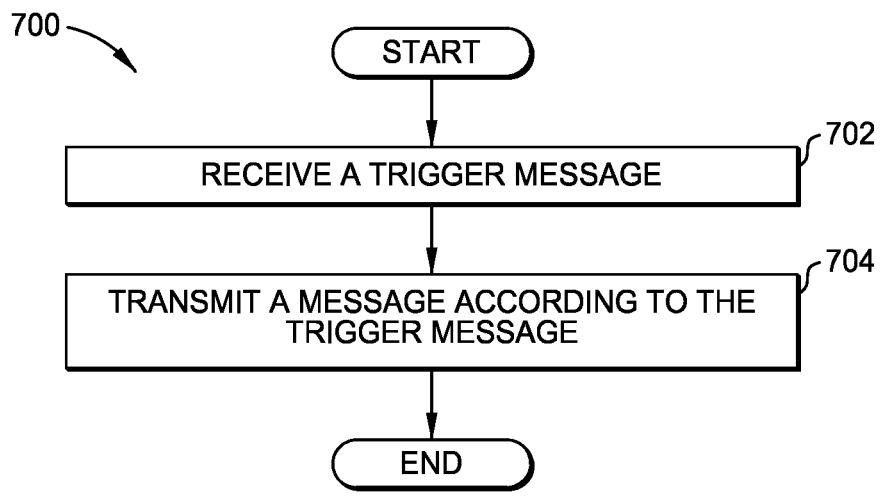
FIG. 7 is a flowchart of an example method in the system of FIG. 1.

FIG. 7 is a flowchart of an example method 700 in the system 100 of FIG. 1. A device 104 performs the method 700. In particular embodiments, by performing the method 700, the device 104 communicates messages to an access node 106 over a shared frequency band using a different uplink power, which removes certain performance bottlenecks during uplink and reduces congestion or slowdowns.

In block 702, the device 104 receives a trigger message 118 from the access node 106. The trigger message 118 includes a field (e.g., a user info field 202) designated for the device 104. The device 104 may locate the field based on the identifier for the device 104 (e.g., AID12 206) included in the field. After the device 104 locates the field designated for the device 104, the device 104 sets its uplink frequency band and uplink power according to an uplink frequency band 122 and uplink power 120 indicated by the designated field.

In block 704, the device 104 transmits a message according to the trigger message 118. The device 104 communicates the message using the uplink frequency band and uplink power indicated in the trigger message 118 for the device 104. The uplink frequency band may be shared amongst several devices 104. The uplink power may be different from the uplink powers used by the other devices 104. In this manner, the device 104 communicates messages to the access node 106 over a shared frequency band but using a different uplink power from other devices 104.

In summary, an access node 106 implements a WiFi communication scheme that uses NOMA during uplink. Generally, the access node 106 instructs one or more connected devices 104 to uplink over a shared frequency band but using different uplink powers. The access node 106 may instruct these devices 104 by broadcasting a trigger message 118 by communicating individual trigger messages 118 to the devices 104. In response, the devices 104 communicate messages to the access node 106 using the shared frequency band and different uplink powers. As a result of multiple devices 104 sharing the uplink frequency band, the access node 106 prevents a performance bottleneck from forming, in particular embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
instructing, by a wireless fidelity (WiFi) access node, a first device to communicate using an uplink frequency band with a first uplink power;

instructing, by the WiFi access node, a second device to communicate using the uplink frequency band with a second uplink power different from the first uplink power;

receiving, by the WiFi access node, a first message comprising a first portion transmitted by the first device with the first uplink power and a second portion transmitted by the second device with the second uplink power;

decoding, by the WiFi access node, the first portion of the first message;

after decoding the first portion of the first message, removing the first portion from the first message to form a second message comprising the second portion; and decoding, by the WiFi access node, the second portion in the second message.

2. The method of claim 1, wherein instructing the first and second devices is accomplished by broadcasting a message to the first and second devices, the message comprising the uplink frequency band, the first uplink power, and the second uplink power.

3. The method of claim 2, wherein the message is a trigger frame comprising a plurality of user info fields, wherein a first user info field of the plurality of user info fields comprises an identifier of the first device and an indication of the first uplink power, and wherein a second user info field of the plurality of user info fields comprises an identifier of the second device and an indication of the second uplink power.

4. The method of claim 1, wherein instructing the first and second devices is accomplished by communicating a first message to the first device and a second message to the second device, the first message indicating the uplink frequency band and the first uplink power and the second message indicating the uplink frequency band and the second uplink power.

5. The method of claim 1, wherein the first uplink power is higher than the second uplink power.

6. The method of claim 5, wherein the first device is closer to the WiFi access node than the second device.

7. The method of claim 1, further comprising instructing, by the WiFi access node, a third device to communicate using a second uplink frequency band with the first uplink power.

8. The method of claim 1, further comprising determining the first and second uplink powers based on a number of devices communicatively coupled to the WiFi access node.

9. A WiFi access node comprising:
a memory; and
a hardware processor communicatively coupled to the memory, the hardware processor configured to:
instruct, by a WiFi access node, a first device to communicate using an uplink frequency band with a first uplink power; and
instruct a second device to communicate using the uplink frequency band with a second uplink power different from the first uplink power;
receive, by the WiFi access node, a first message comprising a first portion transmitted by the first device with the first uplink power and a second portion transmitted by the second device with the second uplink power;
decode, by the WiFi access node, the first portion of the first message;
after decoding the first portion of the first message, remove the first portion from the first message to form a second message comprising the second portion; and
decode, by the WiFi access node, the second portion in the second message.

10. The WiFi access node of claim 9, wherein instructing the first and second devices is accomplished by broadcasting a message to the first and second devices, the message comprising the uplink frequency band, the first uplink power, and the second uplink power.

11. The WiFi access node of claim 9, wherein instructing the first and second devices is accomplished by communicating a first message to the first device and a second message to the second device, the first message indicating the uplink frequency band and the first uplink power and the second message indicating the uplink frequency band and the second uplink power.

12. The WiFi access node of claim 9, wherein the first uplink power is higher than the second uplink power.

13. The WiFi access node of claim 12, wherein the first device is closer to the WiFi access node than the second device.

14. The WiFi access node of claim 9, wherein the first and second uplink powers are determined based on a number of devices connected to the WiFi access node.

15. The WiFi access node of claim 9, further comprising determining the first and second uplink powers based on a number of devices communicatively coupled to the WiFi access node.

16. A method comprising:
receiving, at a first device and from a WiFi access node, an instruction to communicate with the WiFi access node using an uplink frequency band with a first uplink power, wherein a second device was instructed to communicate with the WiFi access node using the uplink frequency band with a second uplink power; and
communicating, by the first device, a first message to the WiFi access node using the uplink frequency band with the first uplink power, wherein the WiFi access node receives a second message comprising first message and a third message transmitted by the second device using the uplink frequency band and the second uplink power, wherein the WiFi access node decodes the first message and then removes the first message from the second message to form a fourth message comprising the third message, and wherein the WiFi access node decodes the third message in the fourth message.

17. The method of claim 16, wherein the first uplink power is higher than the second uplink power.

18. The method of claim 17, wherein the first device is closer to the WiFi access node than the second device.

* * * * *